US 9,227,632 B1

(12) United States Patent
Lee

(10) Patent No.: US 9,227,632 B1
(45) Date of Patent: Jan. 5, 2016

(54) METHOD OF PATH PLANNING FOR EVASIVE STEERING MANEUVER

(71) Applicant: GM GLOBAL TECHNOLOGY OPERATIONS LLC, Detroit, MI (US)

(72) Inventor: Jin-Woo Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/473,892

(22) Filed: Aug. 29, 2014

(51) Int. Cl.
*A01B 69/00* (2006.01)
*B60W 30/095* (2012.01)
*B62D 15/02* (2006.01)

(52) U.S. Cl.
CPC ....... *B60W 30/0953* (2013.01); *B60W 30/0956* (2013.01); *B62D 15/0265* (2013.01)

(58) Field of Classification Search
CPC .................................................. B62D 15/0265
See application file for complete search history.

(56) References Cited

U.S. PATENT DOCUMENTS

| 8,170,739 | B2 | 5/2012 | Lee | |
|---|---|---|---|---|
| 8,428,843 | B2 | 4/2013 | Lee | |
| 2010/0228420 | A1* | 9/2010 | Lee | 701/26 |
| 2014/0229069 | A1* | 8/2014 | Akiyama | 701/41 |

* cited by examiner

*Primary Examiner* — Michael D Lang
(74) *Attorney, Agent, or Firm* — John A. Miller; Miller IP Group, PLC

(57) ABSTRACT

A system and method for providing path planning and generation in a manually driven vehicle that provides a steering correction for collision avoidance purposes. The method includes determining a predicted path of the vehicle based on vehicle motion sensing data and vehicle parameters. The method also includes detecting a moving object in front of the vehicle and determining if a collision between the vehicle and the object will occur if the vehicle travels along the predicted path at the current vehicle speed. The method solves a fifth-order polynomial equation to define a collision avoidance path from the current vehicle position to a waypoint a safe distance from the object and a return path from the waypoint to the lane center that the vehicle is automatically steered along.

20 Claims, 4 Drawing Sheets

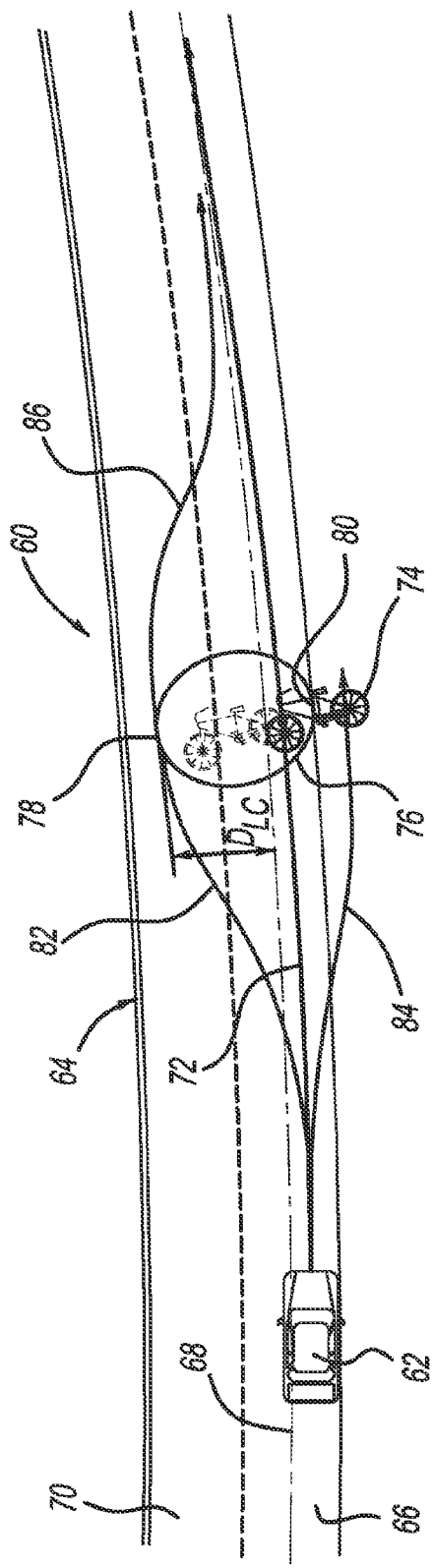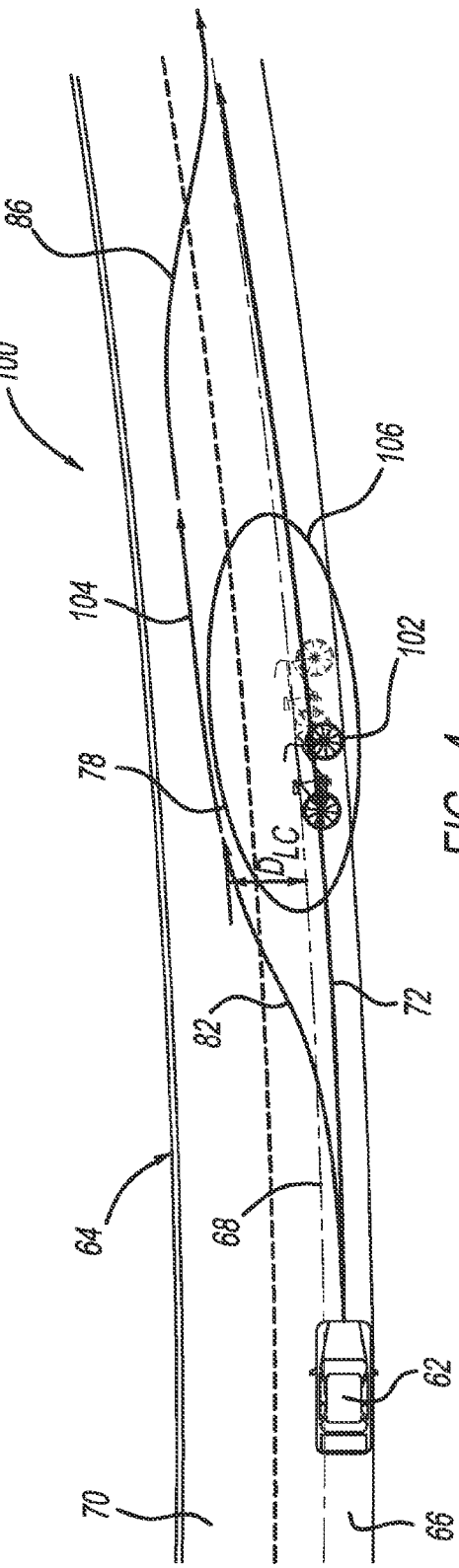

METHOD OF PATH PLANNING FOR EVASIVE STEERING MANEUVER

BACKGROUND OF THE INVENTION

1. Field of the Invention

This invention relates generally to a system and method for providing path planning and generation in a manually driven vehicle and, more particularly, to a system and method for providing path planning and generation in a manually driven vehicle that includes changing the vehicle steering path in response to a detected moving object in front of the vehicle, where the object may be moving in either a transverse or longitudinal direction relative to the vehicle motion.

2. Discussion of the Related Art

The operation of modern vehicles is becoming more autonomous, i.e., vehicles are able to provide driving control with less and less driver intervention. Cruise control systems have been on vehicles for a number of years where the vehicle operator can set a particular speed of the vehicle, and the vehicle will maintain at that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect vehicle stability. Some vehicle systems attempt to maintain the vehicle near the center of a lane on the road. Further, fully autonomous vehicles have been demonstrated that can drive in simulated urban traffic up to 30 mph, observing all of the rules of the road.

As vehicle systems improve, they will become more autonomous with the goal being a complete autonomously driven vehicle. For example, future vehicles probably will employ autonomous systems for lane changing, passing, turns away from traffic, turns into traffic, etc. Smooth maneuvering and automated lane centering and lane changing control is important for driver and passenger comfort in autonomously driven vehicles. However, as a result of sensor and actuator latency, measured vehicle states may be different from actual vehicle states. This difference may cause improper path generation, which will affect lane changing harshness.

U.S. Pat. No. 8,170,739 issued May 1, 2012, titled, Path Generation Algorithm for Automated Lane Centering and Lane Changing Control System, assigned to the assignee of this application and herein incorporated by reference, discloses a system for providing path generation for automated lane center and/or lane changing purposes. The system employs one or more forward-looking cameras that detect lane markings in front of the vehicle for identifying a travel lane on which the vehicle is traveling. A desired path generation processor receives the signals from the camera, vehicle state information and a steering angle of the vehicle, and a request for a vehicle lane change. The system also includes a path prediction processor that predicts the vehicle path based on the vehicle state information including vehicle longitudinal speed, vehicle lateral speed, vehicle yaw-rate and vehicle steering angle. The desired path information and the predicted path information are compared to generate an error signal that is sent to a lane change controller that provides a steering angle signal to turn the vehicle and reduce the error signal, where the path generation processor employs a fifth-order polynomial equation to determine the desired path of the vehicle based on the input signals.

U.S. Patent Application Publication No. 2010/0082195 to Lee et al., titled, Method to Adaptively Control Vehicle Operation Using an Autonomic Vehicle Control System, assigned to the assignee of this application and also herein incorporated by reference, discloses improvements to the path generation algorithm disclosed in the '739 patent that includes determining a preferred travel path for the vehicle based on a predicted travel path and an estimated roadway position.

Both the '739 patent and the '195 application do not provide desired path generation and automatic vehicle steering in a semi-autonomous or autonomously driven vehicle for collision avoidance purposes if a moving object is detected in front of the vehicle.

SUMMARY OF THE INVENTION

The present disclosure describes a system and method for providing path planning and generation in a manually driven vehicle that provides a steering correction for collision avoidance purposes. The method includes determining a predicted path of the vehicle based on vehicle motion sensing data and vehicle parameters. The method also includes detecting a moving object in front of the vehicle and determining if a collision between the vehicle and the object will occur if the vehicle travels along the predicted path at the current vehicle speed. The method determines whether vehicle braking alone will prevent the collision with the object if it is determined that the collision will occur and if not, determines a steering path around the object. The method determines if the moving object is traveling in a transverse or longitudinal direction relative to the vehicle path, and if the object is moving in a transverse direction, the method solves a fifth-order polynomial equation to define a collision avoidance path from the current vehicle position to a waypoint a safe distance from the object and a return path from the waypoint to the lane center that the vehicle is automatically steered along. If the object is moving in a longitudinal direction, the method determines the collision avoidance path to the waypoint then a cruise path adjacent to the object, and then the return path back to the lane center.

Additional features of the present invention will become apparent from the following description and appended claims, taken in conjunction with the accompanying drawings.

BRIEF DESCRIPTION OF THE DRAWINGS

FIG. 3 is an illustration of a vehicle traveling on a roadway including a transverse moving object in front of a vehicle;

FIG. 4 is an illustration of a vehicle traveling on a roadway including a longitudinal moving object in front of a vehicle;

DETAILED DESCRIPTION OF THE EMBODIMENTS

The following discussion of the embodiments of the invention directed to a system and method for providing path planning and generation and collision avoidance with a moving object in a manually driven vehicle is merely exemplary in nature, and is in no way intended to limit the invention or its applications or uses.

Figure 1:
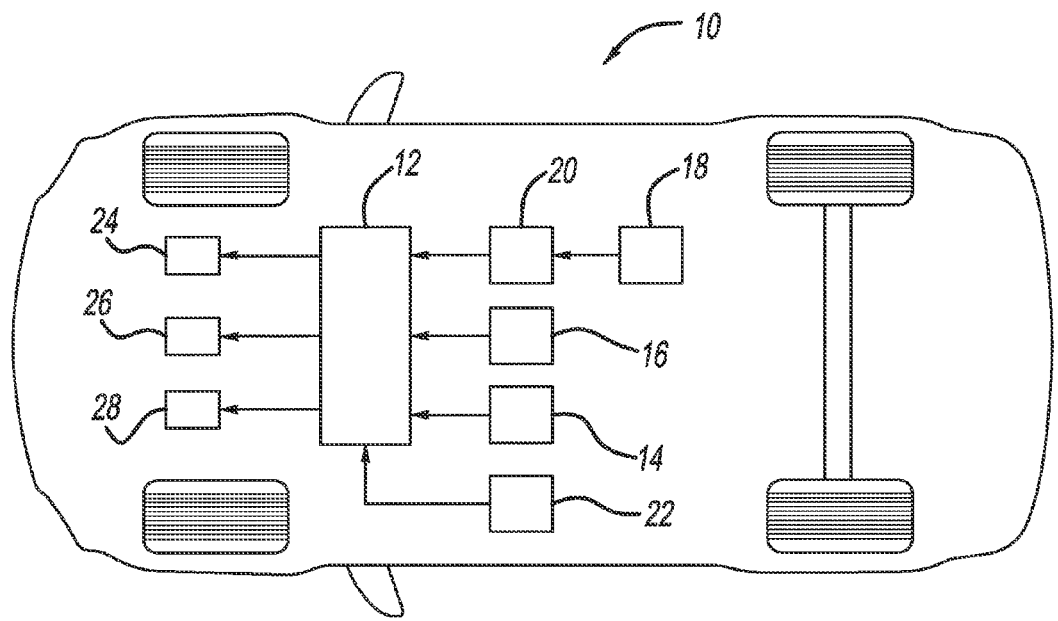
FIG. 1 is an illustration of a vehicle including components necessary for providing path prediction and generation in a semi-autonomous or autonomously driven vehicle.

FIG. 1 is an illustration of a vehicle 10 including a controller 12 that performs all of the necessary processes, calculations, algorithms, etc. discussed herein to provide path prediction, generation and control of the vehicle 10 driven in a semi-autonomous or autonomous manner, where the controller 12 can be any number of independent or combined processors, electronic control units (ECUs), devices, etc. The controller 12 receives signals from one or more forward looking vision cameras 14 that detect lane markings and objects on or in the roadway or otherwise in front of the vehicle 10, where the camera 14 can be any suitable detection device for this purpose, such as a charge-coupled device (CCD) camera, complementary metal oxide semiconductor (CMOS) video image sensors, etc. The vehicle 10 also includes a number of sensors, represented generally as sensor 16, that provides vehicle motion information including, but not limited to, vehicle speed, yaw-rate, steering angle, lateral and longitudinal acceleration, lateral and longitudinal speed, etc. The vehicle 10 further includes a GPS receiver 18 that receives GPS signals identifying the location of the vehicle 10, which are provided to a map database 20 that provides an indication to the controller 12 of the location of the vehicle 10 on the roadway, for example, as spaced apart roadway points. The vehicle 10 also includes a sensor 22 representing any number of sensors, such as cameras, Lidar, radar, etc. that are able to detect objects in front of the vehicle 10. Based on the desired path of the vehicle 10 and whether the vehicle 10 is being semi-autonomously or autonomously driven, the controller 12 may provide output signals to a vehicle brake system 24, a vehicle throttle 26 and/or a vehicle steering system 28.

Figure 2:
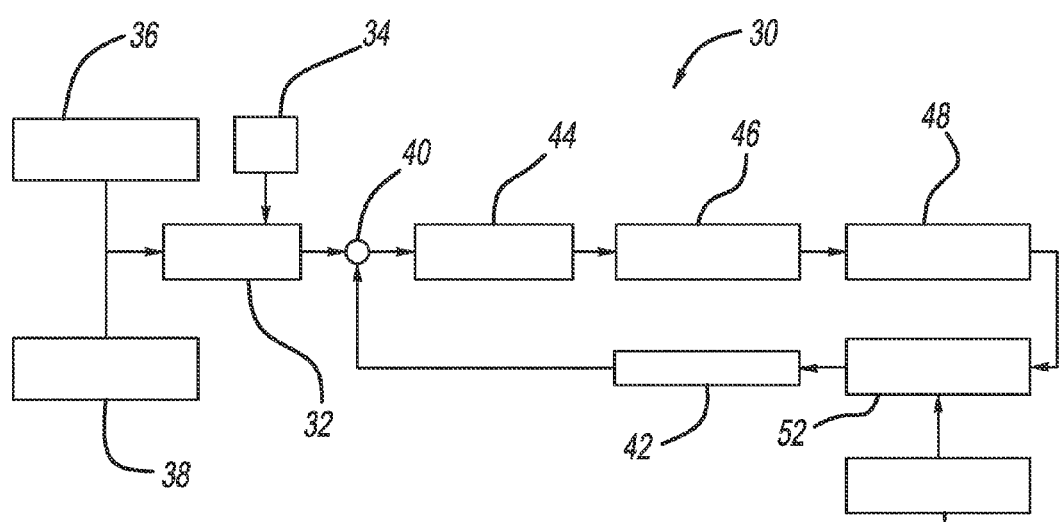
FIG. 2 is a block diagram of a path prediction and generation system.

FIG. 2 is a general schematic block diagram of a lane changing and lane centering system 30 that provides a desired path for the vehicle 10 to follow when changing lanes, either on a straight road or a curved road, and that provides lane centering in an autonomous or semi-autonomous vehicle system. The system 30 includes a desired path generation processor 32 that may receive a driver's request for a lane change from box 34. The desired path prediction processor 32 also receives lane marking detection processor 36 provided by the camera 14 and object detection sensing at box 36 provided by the sensors 22. The lane mark detection processor 36 recognizes the lane marking and represents them with the parameters of lane curvature, tangential angle and lateral offset, where the output of the lane marked detection processor 36 is a heading angle and curvature of the road. The desired path generation processor 32 generates a smooth path for the vehicle 10 when turning that does not have abrupt changes that would otherwise provide passenger discomfort.

The desired path is represented as a series of lateral offsets, heading angles and longitudinal distances over a time period that the lane change will take place. This path information is provided to a comparator 40 that receives a signal from a path prediction processor 42 and provides an error signal between the desired path and the predicted path. The error signal is sent to a high-level lane change controller 44 and a low-level lane change controller 46 that provides a steering angle command signal $\delta_{cmd}$ for the lane change or lane centering. The lane change controllers 44 and 46 generate a sequence of future steering angle commands that minimize the orientation and offset errors between the vehicles desired path and the predicted vehicle path.

The steering angle command signal $\delta_{cmd}$ is then sent to a vehicle dynamics controller 48 that provides the steering control signal $\delta_{cmd}$ to the vehicle steering system 28 on the vehicle 10. As the vehicle 10 turns, the sensors 16 on the vehicle 10, such as a steering angle sensor, speedometer and yaw rate sensor, provide measured signals of the vehicle motion at box 50. The vehicle motion information is provided to a vehicle state estimation processor 52 that provides estimated vehicle state signals, namely, vehicle longitudinal speed, vehicle lateral speed and vehicle yaw-rate. The vehicle state estimation processor 52 uses a vehicle model to filter the estimated vehicle state signals. The state signals are sent to the path prediction processor 42 that will be able to predict the vehicle path for the next few instances in time based on that information. The path prediction processor 42 estimates the vehicle future path based on the current vehicle speed, yaw-rate and steering angle.

FIG. 3 is an illustration 60 of a vehicle 62 traveling on a lane 66 of a roadway 64 having an estimated lane center line 68 at the center of the lane 66 that has been determined by a lane center estimate algorithm from various sensing measurements, e.g., forward-looking camera and GPS/map database, where the roadway 64 also includes an adjacent lane 70 to the lane 66. The vehicle 62 is equipped with all of components necessary for path prediction and generation including a forward-looking vision camera that detects lane marks on the roadway 64, where a series of points along the lane 66 identify the desired position of the vehicle 62 at the camera sampling times as the vehicle 62 travels along or proximate the center line 68, and where the points are an average distance between markings at the right and left edge of the lane 66. It is noted that the position of the vehicle 62 is provided in vehicle coordinates as x, y, where x is the longitudinal direction relative to the vehicle heading and y is the lateral direction of the vehicle relative to the vehicle heading. It is desired that the desired path of the vehicle 62 be exactly overlapped with the lane center line 68. However, in reality, there would be a discrepancy between the desired path that the vehicle 62 needs to follow and the actual center of the lane 66. One reason for the discrepancy is that the initial vehicle position is not in the center of the lane and the moving direction of the vehicle 62 is not perfectly aligned with the lane center line 68. In the illustration 60, the vehicle 62 is traveling along a lane centering path 72, where the algorithm is attempting to center the vehicle 62 on the lane center line 68 so that the path 72 and the line 68 overlap and the vehicle 62 is in the center of the lane 66.

As mentioned above, the '739 patent employs a forward looking camera and a path prediction and generation algorithm, such as may be employed in the controller 12 and/or the system 30, to generate a desired vehicle path to maintain the vehicle 62 at the lane center and a path for lane changing purposes. The desired path is represented as a series of lateral offsets, heading angles and longitudinal distances over a certain time period. The controller 12 generates the desired path based on a predicted lane center using a fifth-order polynomial equation. The fifth-order polynomial equation has six unknowns at the beginning of the process for calculating the desired path. The normalized path problem is independent of the vehicle states, where the vehicle states are used for coordinate conversion for normalized coordinates to vehicle coordinates. Continuity assumptions are employed in the algorithm for a smooth path and include the start position and the orientation angle of the desired path aligned with the current vehicle position and the vehicle moving direction, where a lane change path should finish at the center of the destination lane and align with the lane in the first and second order derivatives.

The process for determining the lane centering path 72 from the '739 patent is partially recreated below. The camera 14 provides estimates of the position and orientation of the lane 66 with respect to the center of the vehicle 62. In this embodiment, the roadway 64 is modeled as two sections of second-order polynomial equations as:

$$y_{sec1}(x) = A_1 x^2 + B_1 x + C_1, \quad 0 < x < x_1, \tag{1}$$

$$y_{sec2}(x) = A_2 x^2 + B_2 x + C_2, \quad x_1 < x < x_2, \tag{2}$$

where $x_1$ and $x_2$ represent the end points along the x-axis of the first section and the second section and $y_{sec1}$ and $y_{sec2}$ represent the lateral offset of the roadway 64 with respect to the vehicle coordinate system $R_v(t)$. The measurements provided by the camera 14 include yaw angle $\phi_{r,1}$ of the vehicle 62 with respect to the first section of the roadway 64, lateral offset $y_{r,1}$ of the vehicle's center of gravity from the lane 66, and roadway curvature $\rho_1$ and $\rho_2$ of the first section and the second section.

From the geometric relationship between the roadway 64 and the lane representation, the coefficients of equations (1) and (2) can be related as:

$$A_1 = \frac{\rho_1}{2}, \tag{3}$$

$$A_2 = \frac{\rho_2}{2}, \tag{4}$$

$$B_1 = \tan \phi_1, \tag{5}$$

$$C_1 = y_{r,1}. \tag{6}$$

It is assumed that the roadway 64 runs without discontinuity, that is, the two sections of each roadway representation connect smoothly without an abrupt change at the transition point $x_1$. Only the zeroth and first order continuity are assumed herein, so equations (7) and (8) below hold at the transition point $x_1$.

$$y_{sec1}(x_1) = y_{sec2}(x_1), \tag{7}$$

$$\frac{d y_{sec1}}{dx}\bigg|_{x=x1} = \frac{d y_{sec2}}{dx}\bigg|_{x=x1}. \tag{8}$$

Substituting equations (3)-(8) into equations (1) and (2) provides:

$$C_2 = y_{sec1}(x_1), \tag{9}$$

$$B_1 = 2A_1 x_1 + B_1. \tag{10}$$

By integrating equations (3)-(6), (9) and (10), equations (1) and (2) can be rewritten in terms of the measurements of the camera 14 as:

$$y_{sec1}(x) = \frac{\rho_1}{2} x^2 + \tan(\varphi_1) x + y_{r,1}, \quad 0 < x < x_1 \tag{11}$$

$$y_{sec2}(x) = \frac{\rho_2}{2} x^2 + (\rho_1 \cdot x_1 + \tan(\varphi_1)) x + y_{seg1}(x_1), \quad x_1 < x < x_2 \tag{12}$$

Assuming that the vehicle 62 is operating at a longitudinal speed $v_x$ and there are no obstacles in the roadway 64, then the driver/passengers comfort depends on the vehicle's lateral acceleration $a_y$, and the lateral acceleration $a_y$ is a function of the vehicle speed $v_x$ and the steering angle $\delta$. A time variable $t_{LX}$ is specified to complete a lane change maneuver independent of the vehicle longitudinal speed $v_x$ unless the calculated lateral acceleration $a_y$ is predicted to be over a certain limit during the lane change maneuver. If the lateral acceleration $a_y$ is over the limit, a new path is calculated with a new extended lane change maneuvering time.

The vehicle longitudinal speed $v_x$ is measured by the vehicle speedometer, and the lateral offset, heading angle and roadway curvature $\rho$ are measured by the camera 14. The desired path generation is formulated for the lane change maneuver as a boundary condition problem. Assume that the lane change control begins at $t=0$ and define $(x(t), y(t))$ as the vehicle position at time t with respect to the origin $R_v(0)$ of the coordinate system. Note that the coordinate system $R_v$ is the vehicle coordinate system captured at time $t=0$ and the position and the heading angle of the vehicle 62 at $t=0$ are aligned with $R_v(0)$. Thus, $(x(t=0), y(t=0)) = (0,0)$ and $y'(0) = 0$ can be set without loss of generality.

The initial and final states $(y, y', y'')_{t=0}$ and $(y, y', y'')_{t=t_{LX}}$ of the vehicle 62 can then be obtained by manipulating the roadway representation equations (11) and (12). The value $(x(t_{LX}), y(t_{LX}))$ corresponds to the desired position of the vehicle 62 at time $t=t_{LX}$, where $x(t_{LX})$ can be estimated by integrating the vehicle longitudinal speed $v_x$ and the value $y(t_{LX})$ can be obtained by the lane width and the roadway geometry. Note that $y_r$ in equations (3)-(6) represents the lateral offset of the roadway from the center of the vehicle 62, and here y represents the vehicle location with respect to $R_v(0)$.

Selecting a fifth-order polynomial equation for the x and y positions of the vehicle 62 gives:

$$y(x) = a_5 x^5 + a_4 x^4 + a_3 x^3 + a_2 x^2 + a_1 x + a_0. \tag{13}$$

Considering the initial and final conditions gives:

$$(y(x), y'(x), y''(x))_{t=0} = (0, 0, y''_{seg1}(x(0))), \tag{14}$$

$$(y(x), y'(x), y''(x))_{t=t_{LX}} = \begin{cases} (y_{seg1}(x(t_{LX})), y'_{seg1}(x(t_{LX})), y''_{seg1}(x(t_{LX}))), & \text{if } 0 < x(t_{LX}) < x_1 \\ (y_{seg2}(x(t_{LX})), y'_{seg2}(x(t_{LX})), y''_{seg2}(x(t_{LX}))), & \text{if } x_1 < x(t_{LX}) < x_2 \end{cases}. \tag{15}$$

The problem can be solved by the following linear equation:

$$\begin{bmatrix} a_0 \\ a_1 \\ a_2 \\ a_3 \\ a_4 \\ a_5 \end{bmatrix} = \begin{bmatrix} 1 & x(0) & x^2(0) & x^3(0) & x^4(0) & x^5(0) \\ 0 & 1 & 2x(0) & 3x^2(0) & 4x^3(0) & 5x^4(0) \\ 0 & 0 & 2 & 6x(0) & 12x^2(0) & 20x^3(0) \\ 1 & x(t_{LX}) & x^2(t_{LX}) & x^3(t_{LX}) & x^4(t_{LX}) & x^5(t_{LX}) \\ 0 & 1 & 2x(t_{LX}) & 3x^2(t_{LX}) & 4x^3(t_{LX}) & 5x^4(t_{LX}) \\ 0 & 0 & 0 & 6x(t_{LX}) & 12x^2(t_{LX}) & 20x^3(t_{LX}) \end{bmatrix}^{-1} \begin{bmatrix} y(x(0)) \\ y'(x(0)) \\ y''(x(0)) \\ y(x(t_{LX})) \\ y'(x(t_{LX})) \\ y''(x(t_{LX})) \end{bmatrix}. \tag{16}$$

The path generation problem can be simplified by normalization of the coordinates. Denoting the normalized coordinates as $(x_n(t), y_n(t))$ gives:

$$x_n(t) = \frac{x(t)}{x(t_{LX})}, \qquad (17)$$

$$y_n(x(t)) = \frac{y(x(t))}{y(x(t_{LX}))}. \qquad (18)$$

Substituting equations (17) and (18) into equation (13) and redefining the coefficients of the polynomial equation, $y_n$ can be obtained by the following equation:

$$y_1(x_n) = a_{n,5}x_n^5 + a_{n,4}x_n^4 + a_{n,3}x_n^3 + a_{n,2}x_n^2 + a_{n,1}x_n + a_{n,0}. \qquad (19)$$

Applying the normalized coordinates of equations (17) and (18) into the initial and final conditions, the normalized coordinates can be rewritten to the conditions as:

$$(y_n(x_n), y'(x_n)_n, y''(x_n)_n)_{t=0} = \left(0, 0, y''_{seg1}(x(0)) \cdot \frac{x^2(t_{LX})}{y(t_{LX})}\right), \qquad (20)$$

$$(y_n(x_n), y'(x_n)_n, y''(x_n)_n)_{t=t_{LX}} = \qquad (21)$$

$$\begin{cases} \left(1, y'_{seg1}(x(t_{LX})) \cdot \frac{x(t_{LX})}{y(t_{LX})}, y''_{seg1}\left(x(t_{LX}) \cdot \frac{x^2(t_{LX})}{y(t_{LX})}\right)\right), & \text{if } 0 < x < x_1 \\ \left(1, y'_{seg2}(x(t_{LX})) \cdot \frac{x(t_{LX})}{y(t_{LX})}, y''_{seg2}\left(x(t_{LX}) \cdot \frac{x^2(t_{LX})}{y(t_{LX})}\right)\right), & \text{if } x_1 < x < x_2 \end{cases}.$$

The linear equation problem of equation (16) can then be simplified as:

$$\begin{bmatrix} a_{n,0} \\ a_{n,1} \\ a_{n,2} \\ a_{n,3} \\ a_{n,4} \\ a_{n,5} \end{bmatrix} = \begin{bmatrix} 1 & 0 & 0 & 0 & 0 & 0 \\ 0 & 1 & 0 & 0 & 0 & 0 \\ 0 & 0 & 2 & 0 & 0 & 0 \\ 1 & 1 & 1 & 1 & 1 & 1 \\ 0 & 1 & 2 & 3 & 4 & 5 \\ 0 & 0 & 2 & 6 & 12 & 20 \end{bmatrix}^{-1} \begin{bmatrix} y_n(0) \\ y'_n(0) \\ y''_n(0) \\ y_n(1) \\ y'_n(1) \\ y''_n(1) \end{bmatrix}. \qquad (22)$$

Note that the roadway conditions are captured only by the y-vector and the matrix is a constant matrix regardless of the initial condition, the final condition or the road geometry. Therefore, the solution of equation (22) can be obtained by a few simple algebraic computations. Once the solution is calculated, equation (19) represents the desired path to complete the current lane change maneuver in normalized coordinates. Applying equation (18) can yield the desired path profile in the vehicle coordinates.

Recall the initial position of the vehicle $(x(t=0), y(t=0)=(0, 0)$ and the initial heading angle $y'0=0$ because the vehicle motion is described by the vehicle coordinate system captured at $t=0$, $R_v(0)$. In curved roadway cases, the boundary conditions can be written as:

$$(y(x(0)) \; y'(x(0)) \; y''(x(0))) = (0 \; 0 \; y''_{seg}(0)), \qquad (23)$$

$$(y(x(t_{LX})) \; y'(x(t_{LX})) \; y''(x(t_{LX}))) = (y_{seg}(x(t_{LX})) + L \; y'_{seg}(x(t_{LX})) \; y''_{seg}(x(t_{LX}))), \qquad (24)$$

where L is the lane width and $x(t_{LX})$ is the x-coordinate at time $t_{LX}$ that corresponds to the longitudinal distance of travel to complete the lane change maneuver. The value $x(t_{LX})$ can be estimated by integrating the vehicle speed $v_x$ over time. Note that $y_{seg}$ can be either $y_{seg1}$ and $y_{seg2}$ depending on which segment $x(t_{LX})$ belongs to, i.e.:

$$y_{seg} = \begin{cases} y_{seg1}(x(t_{LX})), & \text{if } 0 < x(t_{LX}) < x_1 \\ y_{seg2}(x(t_{LX})), & \text{if } x_1 < x(t_{LX}) < x_2 \end{cases}. \qquad (25)$$

In normalized form, the initial and final conditions are:

$$(y_n(x_n = 0) \; y'_n(x_n = 0) \; y''_n(x_n = 0)) = \left(0 \; 0 \; y''_{seg}(0) \cdot \frac{x^2(t_{LX})}{y(x(t_{LX}))}\right), \qquad (26)$$

$$(y_n(x_n = 1) \; y'_n(x_n = 1) \; y''_n(x_n = 1)) = \qquad (27)$$
$$\left(1 \; y'_{seg}(x(t_{LX})) \cdot \frac{x(t_{LX})}{y(x(t_{LX}))} \; y''_{seg}(x(t_{LX})) \cdot \frac{x^2(t_{LX})}{y(x(t_{LX}))}\right),$$

Substituting equations (26) and (27) into the linear equation (22) results in the following solution:

$$a_{n,0} = a_{n,1} = 0, \qquad (28)$$

$$a_{n,2} = 0.5 y''_{seg1} \cdot \frac{x^2(t_{Lx})}{y(x(t_{Lx}))}, \qquad (29)$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) - 0.5 y''_{seg}(0) \cdot \frac{x^2(t_{Lx})}{y(x(t_{Lx}))} \\ y'_n(1) - 0.5 y''_{seg}(0) \cdot \frac{x^2(t_{Lx})}{y(x(t_{Lx}))} \\ y''_n(1) - 0.5 y''_{seg}(0) \cdot \frac{x^2(t_{Lx})}{y(x(t_{Lx}))} \end{bmatrix}. \qquad (30)$$

Note that $y_{seg}$ can be either $y_{seg1}$ or $y_{seg2}$ depending on which segment $x(t_{LX})$ belongs to.

As seen in equation (30), the first two coefficients of the polynomial equation are always zero. Further the rest of the coefficients can be calculated with a few algebraic computations with the boundary conditions.

For straight road cases, the path generation problem can be further simplified. The road curvature $\rho$ is zero throughout the lane change maneuver and the desired heading angle at the end of the lane change will be also zero. Thus, initial and final conditions are:

$$(y(x(0)) \; y'(x(0)) \; y''(x(0))) = (0 \; 0 \; 0), \qquad (31)$$

$$(y(x(t_{LX})) \; y'(x(t_{LX})) \; y''(x(t_{LX}))) = (L \; 0 \; 0), \qquad (32)$$

where L is the lane width.

In normalized form, the initial and final conditions can be written as:

$$(y_n(x_n=0) \; y'_n(x_n=0) \; y''_n(x_n=0)) = (0 \; 0 \; 0), \qquad (33)$$

$$(y_n(x_n=1) \; y'_n(x_n=1) \; y''_n(x_n=1)) = (1 \; 0 \; 0). \qquad (34)$$

Finally, substituting the conditions of equations (33) and (34) in the linear equation leads to the following solution:

$$a_{n,0} = a_{n,1} = a_{n,2} = 0, \quad (35)$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) \\ y'_n(1) \\ y''_n(1) \end{bmatrix} = \begin{bmatrix} 10 \\ -15 \\ 6 \end{bmatrix}. \quad (36)$$

As seen in equation (36), the coefficients of the polynomial equation for the straight road are constant regardless of the lane change maneuver distance, that is, the desired path is predetermined and no online computation is needed for the lane change maneuver for straight road circumstances.

The discussion above can be generalized as follows. The camera 14 detects the lane markings on the ground and reports the center line 68 of the lane 66 as a third-order polynomial equation:

$$y_{lane}(x) = c_3 \cdot x^3 + c_2 \cdot x^2 + c_1 \cdot x + c_0, \quad (37)$$

where $c_1$, $c_2$ and $c_3$ are camera measurements identifying the center of the lane 66, the current position of the vehicle 62 is zero, and where the vehicle 62 is aligned with the second derivative of the curve.

The lane centering controller then generates the lane centering path 72, i.e., a path from the current vehicle position to the lane center line 68, at every time step as a single fifth-order polynomial equation:

$$y_{LC}(x) = a_{0,LC} + a_{1,LC}x + a_{2,LC}x^2 + a_{3,LC}x^3 + a_{4,LC}x^4 + a_{5,LC}x^5, \quad (38)$$

for $0 < x \leq x_{cam\_range}$ and where $a_{0,LC}$, $a_{1,LC}x$, $a_{2,LC}x^2$, $a_{3,LC}x^3$, $a_{4,LC}x^4$ and $a_{5,LC}x^5$ are determined by the lane centering path generating algorithm.

The discussion above provides the calculations and operations that are employed to model the path 72 as a fifth-order polynomial equation for the vehicle 62 to follow as defined by measurements from the camera 14 and as set forth in the '739 patent. However, that discussion does not consider the situation where a moving object, either travelling in a transverse direction or a longitudinal direction, is detected in front of the vehicle 62 and in a collision path therewith and how to take an evasive steering action to steer around the object if it is determined that braking alone will not avoid the collision.

As will be discussed below, the present invention describes path generation in a semi-autonomous or autonomously driven vehicle that avoids a collision with a moving object, referred to as collision avoidance path (AP) generation, a steering path around the moving object, referred to as cruise path (CP) generation, and path generation to return to the original lane centered path after passing the object, referred to as return path (RP) generation.

While the path generation process is being performed and the vehicle 62 is being automatically steered towards the center line 68 of the lane 66, the object detection sensor 22 will be monitoring and providing object detection of objects in front of the vehicle 62. The illustration 60 shows a moving object 74, here a bicycle, moving transversely across the lane 66 in front of the vehicle 62. The object detecting sensor 22 will detect the object 74 and provide an indication of the moving direction, speed, location and size of the object 74 based on the available technology. Further, based on this information, the algorithm determines a time-to-collision value $t_{TTC}$ based on the current vehicle speed and the position of the object 74. Also, the algorithm determines a collision boundary 76 that identifies the location that a collision with the object 74 is likely to be considering the speed of the object 74, the size of the object 74 and the value $t_{TTC}$. The collision boundary 76 will be large enough to provide a suitable safety margin. The algorithm determines if the lane centering path 72 of the vehicle 62 passes through the collision boundary 76, and if not, there is not a collision threat and the vehicle 62 proceeds along the path 72 at the determined speed.

If the algorithm determines that the lane centering path 72 at the vehicle speed will cross the collision boundary 76, the algorithm determines if an evasive braking maneuver will avoid a collision with the object 74. Particularly, given the current vehicle speed and the distance to the object 74, the algorithm calculates the required deceleration to avoid the collision with the object 74 as:

$$a_{x,req} = -\frac{v_x^2}{2s_f}, \quad (39)$$

where $v_x$ is the current vehicle speed and $s_f$ is the distance to the object 74.

The algorithm then compares the required deceleration $a_{x,req}$ with a maximum possible deceleration limit $a_{x,max}$ of the vehicle 62, and if $|a_{x,req}|$ is less than $a_{x,max}$, the algorithm calculates the vehicle speed profile as:

$$v(t) = v_x + a_{x,req} t. \quad (40)$$

However, if $|a_{x,req}|$ is greater than $a_{x,max}$, then braking alone cannot avoid a collision with the object 74 and the algorithm proceeds with determining an evasive steering maneuver around the object 74 as will be discussed below.

The collision boundary 76 includes two waypoints 78 and 80 that are determined from the current vehicle position as the location where the vehicle 62 must move to avoid a collision with the object 74. A collision avoidance path 82 from the vehicle 62 to the point 78 is one possible path to avoid the object 74 and a collision avoidance path 84 from the vehicle 62 to the point 80 is another possible path to avoid the object 74. The algorithm determines if both of the two waypoints 78 and 80 are within the roadway boundary or outside of the roadway boundary in a non-drivable area. If both of the waypoints 78 and 80 are within the roadway boundary, the algorithm calculates a lateral distance $D_{LC}$ from the vehicle position to each of the waypoints 78 and 80 from the lane center path 72 and selects the waypoint 78 or 80 that causes the smaller lateral deviation of the vehicle 62 from the lane centering path 72. In the example shown in FIG. 3, the path 84 is outside of the roadway boundary, and is disregarded as a possible path for the vehicle 62 to avoid the object 74. Therefore, the path 82 is selected as the collision avoidance path $y_{AP}$ for the vehicle 62 to avoid the object 74.

The collision avoidance path 82 is determined in the manner discussed above as a fifth-order polynomial equation:

$$y_{AP}(x) = a_{5,AP}x^5 + a_{4,AP}x^4 + a_{3,AP}x^3 + a_{2,AP}x^2 + a_{1,AP}x + a_{0,AP}, \quad (41)$$

for $0 < t < t_{TTC}$ and where $a_{0,AP}$, $a_{1,AP}$, $a_{2,AP}$, $a_{3,AP}$, $a_{4,AP}$ and $a_{5,AP}$ are unknown coefficients.

Initial conditions at the beginning of the collision avoidance path 82 are defined as:

$$y_{AP}(0) = 0, \quad (42)$$

$$y'_{AP}(0) = 0, \quad (43)$$

$$y''_{AP}(0) = 2c_2. \quad (44)$$

From the initial conditions and equations (42)-(44), the unknown coefficients $a_{0,AP}$, $a_{1,AP}$ and $a_{2,AP}$ can be determined as:

$$a_{0,AP}=0, \tag{45}$$

$$a_{1,AP}=0, \tag{46}$$

$$a_{2,AP}=c_2. \tag{47}$$

Boundary conditions of the collision avoidance path 82 are defined as:

$$y_{AP}(v_x t_{TTC})=y_{lane}(v_x t_{TTC})+D_{LC}, \tag{48}$$

$$y'_{AP}(v_x t_{TTC})=y'_{lane}(v_x t_{TTC}), \tag{49}$$

$$y''_{AP}(v_x t_{TTC})=y''_{lane}(v_x t_{TTC}). \tag{50}$$

The boundary conditions provide three equations (48)-(50) having three unknown coefficients $a_{3,AP}$, $a_{4,AP}$ and $a_{5,AP}$ which can be solved as:

$$c_2 \cdot (v_x t_{TTC})^2 + a_{3,AP} \cdot (v_x t_{TTC})^3 + a_{4,AP} \cdot (v_x t_{TTC})^4 + a_{5,AP} \cdot (v_x t_{TTC})^5 = y_{lane}(v_x t_{TTC}) + D_{LC}, \tag{51}$$

$$2c_2 \cdot (v_x t_{TTC}) + 3a_{3,AP} \cdot (v_x t_{TTC})^2 + 4a_{4,AP} \cdot (v_x t_{TTC})^3 + 5a_{5,AP} \cdot (v_x t_{TTC})^4 = y'_{lane}(v_x t_{TTC}), \tag{52}$$

$$2c_2 + 6a_{3,AP} \cdot (v_x t_{TTC}) + 12a_{4,AP} \cdot (v_x t_{TTC})^2 + 20a_{5,AP} \cdot (v_x t_{TTC})^3 = y''_{lane}(v_x t_{TTC}). \tag{53}$$

After the collision path 80 is solved, and for the situation of a cross-moving object, the algorithm then calculates a return path (RP) from the waypoint 78 to the center line 68 of the original lane 66 as identified by return path 86 in the illustration 60. Using the deviation $D_{LC}$, a time-to-return value $t_{TTR}$ from the waypoint 78 to the center line 68 of the original lane 66 can be estimated as:

$$t_{TTR}=t_{TTC}+\Delta T_{LX} D_{LC}/L, \tag{54}$$

where $\Delta T_{LX}$ is a typical lane change time, such as 5 or 6 seconds.

As above, the return path 86 is defined as a fifth-order polynomial equation:

$$y_{RP}(x)=a_{5,RP}x^5 + a_{4,RP}x^4 + a_{3,RP}x^3 + a_{2,RP}x^2 + a_{1,RP}x + a_{0,RP}, \tag{55}$$

for $t_{TTC} < t < t_{TTR}$ and where the coefficients $a_{0,RP}$, $a_{1,RP}$, $a_{2,RP}$, $a_{3,RP}$, $a_{4,RP}$ and $a_{5,RP}$ are unknown.

Initial conditions of the return path 86 are defined as:

$$y_{RP}(v_x t_{TTC})=y_{AP}(v_x t_{TTC}), \tag{56}$$

$$y'_{RP}(v_x t_{TTC})=y'_{AP}(v_x t_{TTC}), \tag{57}$$

$$y''_{RP}(v_x t_{TTC})=y''_{AP}(v_x t_{TTC}), \tag{58}$$

and boundary conditions of the return path 86 are defined as:

$$y_{RP}(v_x t_{TTR})=y_{lane}(v_x t_{TTR}), \tag{59}$$

$$y'_{RP}(v_x t_{TTR})=y'_{lane}(v_x t_{TTR}), \tag{60}$$

$$y''_{RP}(v_x t_{TTR})=y''_{lane}(v_x t_{TTR}). \tag{61}$$

Because there are six equations and the six unknown coefficients $a_{0,RP}$, $a_{1,RP}$, $a_{2,RP}$, $a_{3,RP}$, $a_{4,RP}$ and $a_{5,RP}$, the coefficients can be determined from equations (56)-(61) and the return path 86 is solved as:

$$a_{0,RP} + a_{1,RP}(v_x t_{TTC}) + a_{2,RP}(v_x t_{TTC})^2 + a_{3,RP}(v_x t_{TTC})^3 + a_{4,RP}(v_x t_{TTC})^4 + a_{5,RP}(v_x t_{TTC})^5 = y_{AP}(v_x t_{TTC}), \tag{62}$$

$$a_{1,RP} + 2a_{2,RP}(v_x t_{TTC}) + 3a_{3,RP}(v_x t_{TTC})^2 + 4a_{4,RP}(v_x t_{TTC})^3 + 5a_{5,RP}(v_x t_{TTC})^4 = y'_{AP}(v_x t_{TTC}), \tag{63}$$

$$2a_{2,RP} + 6a_{3,RP}(v_x t_{TTC}) + 12a_{4,RP}(v_x t_{TTC})^2 + 20a_{5,RP}(v_x t_{TTC})^3 = y''_{AP}(v_x t_{TTC}), \tag{64}$$

$$a_{0,RP} + a_{1,RP}(v_x t_{TTC}) + a_{2,RP}(v_x t_{TTC})^2 + a_{3,RP}(v_x t_{TTC})^3 + a_{4,RP}(v_x t_{TTC})^4 + a_{5,RP}(v_x t_{TTC})^5 = y_{lane}(v_x t_{TTC}), \tag{65}$$

$$a_{1,RP} + 2a_{2,RP}(v_x t_{TTC}) + 3a_{3,RP}(v_x t_{TTC})^2 + 4a_{4,RP}(v_x t_{TTC})^3 + 5a_{5,RP}(v_x t_{TTC})^4 = y'_{lane}(v_x t_{TTC}), \tag{66}$$

$$2a_{2,RP} + 6a_{3,RP}(v_x t_{TTC}) + 12a_{4,RP}(v_x t_{TTC})^2 + 20a_{5,RP}(v_x t_{TTC})^3 = y''_{lane}(v_x t_{TTC}), \tag{67}$$

The discussion above is for the object 74 that is moving in a transverse direction relative to the vehicle travel direction and as such only the collision avoidance path 82 and the return path 86 need to be calculated to avoid the object 74. However, if the object sensors 22 determine that the object is moving in a collision path in front of the vehicle 62 in a longitudinal direction relative the vehicle travel direction or the object 74 is too long to be avoided by the collision avoidance path 82 and the return path 86, then the algorithm calculates a cruise path (CP) between the collision avoidance path 82 and the return path 86.

FIG. 4 is an illustration 100 similar to the illustration 60, where like elements are identified by the same reference number, depicting this situation where a moving object 102, here a bicycle, is traveling in front of the vehicle 62 and with substantially the same heading. A cruise path 104 is shown adjacent to the object 102 between the collision avoidance path 80 and the return path 86 that allows the vehicle 62 to travel around the object 102, where the cruise path 104 starts at the waypoint 78 and follows the lane boundary with the lane offset $D_{LC}$. As shown, the collision boundary 106 is modified in size and shape to consider the moving direction of the object 102.

The length of the cruise path 104 is defined by a time-to-cruise value $t_{TTS}$ that is determined from the speed of the object 102 and its direction as:

$$t_{TTS} = t_{TTC} + \frac{v_x - v_{x,obs}}{l} + t_{margin}, \tag{68}$$

where $v_x$ is vehicle speed, $v_{x,obs}$ is the speed of the object 102, $l$ is the length of the object 102, and $t_{margin}$ is a safety margin in the cruise time.

As above, the cruise path 104 is defined as a fifth-order polynomial equation:

$$y_{CP}(x)=a_{5,CP}x^5 + a_{4,CP}x^4 + a_{3,CP}x^3 + a_{2,CP}x^2 + a_{1,CP}x + a_{0,CP}, \tag{69}$$

for $t_{TTC} < t < t_{TTS}$ and where the coefficients $a_{0,CP}$, $a_{1,CP}$, $a_{2,CP}$, $a_{3,CP}$, $a_{4,CP}$ and $a_{5,CP}$ are unknown.

Initial conditions of the cruise path 104 are defined as:

$$y_{CP}(v_x t_{TTC})=y_{AP}(v_x t_{TTC}), \tag{70}$$

$$y'_{CP}(v_x t_{TTC})=y'_{AP}(v_x t_{TTC}), \tag{71}$$

$$y''_{CP}(v_x t_{TTC})=y''_{AP}(v_x t_{TTC}), \tag{72}$$

and boundary conditions of the cruise path 104 are defined as:

$$y_{CP}(v_x t_{TTS})=y_{lane}(v_x t_{TTS})+D_{LC}, \tag{73}$$

$$y'_{CP}(v_x t_{TTS})=y'_{lane}(v_x t_{TTS}), \tag{74}$$

$$y''_{CP}(v_x t_{TTS})=y''_{lane}(v_x t_{TTS}). \tag{75}$$

Since there are six equations and six unknowns, the cruise path 104 is determined or solved by calculating the coefficients $a_{0,CP}$, $a_{1,CP}$, $a_{2,RP}$, $a_{3,CP}$, $a_{4,CP}$ and $a_{5,CP}$ from the initial and boundary conditions as:

$$a_{0,CP} + a_{1,CP}(v_x t_{TTC}) + a_{2,CP} \cdot (v_x t_{TTC})^2 + a_{3,CP} \cdot (v_x t_{TTC})^3 + a_{4,CP} \cdot (v_x t_{TTC})^4 + a_{5,CP} \cdot (v_x t_{TTC})^5 = y_{AP}(v_x t_{TTC}), \quad (76)$$

$$a_{1,CP} + 2a_{2,CP} \cdot (v_x t_{TTC}) + 3a_{3,CP} \cdot (v_x t_{TTC})^2 + 4a_{4,CP} \cdot (v_x t_{TTC})^3 + 5a_{5,CP} \cdot (v_x t_{TTC})^4 = y'_{AP}(v_x t_{TTC}), \quad (77)$$

$$2a_{2,CP} + 6a_{3,CP} \cdot (v_x t_{TTC}) + 12a_{4,CP} \cdot (v_x t_{TTC})^2 + 20a_{5,CP} \cdot (v_x t_{TTC})^3 = y''_{AP}(v_x t_{TTC}), \quad (78)$$

$$a_{0,CP} + a_{1,CP}(v_x t_{TTS}) + a_{2,CP} \cdot (v_x t_{TTS})^2 + a_{3,CP} \cdot (v_x t_{TTS})^3 + a_{4,CP} \cdot (v_x t_{TTS})^4 + a_{5,CP} \cdot (v_x t_{TTS})^5 = y_{lane}(v_x t_{TTS}), \quad (79)$$

$$a_{1,CP} + 2a_{2,CP} \cdot (v_x t_{TTS}) + 3a_{3,CP} \cdot (v_x t_{TTS})^2 + 4a_{4,CP} \cdot (v_x t_{TTS})^3 + 5a_{5,CP} \cdot (v_x t_{TTS})^4 = y'_{lane}(v_x t_{TTS}), \quad (80)$$

$$2a_{2,CP} + 6a_{3,CP} \cdot (v_x t_{TTS}) + 12a_{4,SP} \cdot (v_x t_{TTS})^2 + 20a_{5,CP} \cdot (v_x t_{TTS})^3 = y''_{lane}(v_x t_{TTS}). \quad (81)$$

The return path 86 is then calculated from the end of the cruise path 104 in the same manner as for equations (62)-(67) above with the same boundary conditions, but with different initial conditions as follows:

$$y_{RP}(v_x t_{TTS}) = y_{CP}(v_x t_{TTS}), \quad (82)$$

$$y'_{RP}(v_x t_{TTS}) = y'_{CP}(v_x t_{TTS}), \quad (83)$$

$$y''_{RP}(v_x t_{TTS}) = y''_{CP}(v_x t_{TTS}), \quad (84)$$

$$a_{0,RP} + a_{1,RP}(v_x t_{TTS}) + a_{2,RP} \cdot (v_x t_{TTS})^2 + a_{3,RP} \cdot (v_x t_{TTS})^3 + a_{4,RP} \cdot (v_x t_{TTS})^4 + a_{5,RP} \cdot (v_x t_{TTS})^5 = y_{AP}(v_x t_{TTS}), \quad (85)$$

$$a_{1,RP} + 2a_{2,RP} \cdot (v_x t_{TTS}) + 3a_{3,RP} \cdot (v_x t_{TTS})^2 + 4a_{4,RP} \cdot (v_x t_{TTS})^3 + 5a_{5,RP} \cdot (v_x t_{TTS})^4 = y'_{AP}(v_x t_{TTS}), \quad (86)$$

$$2a_{2,RP} + 6a_{3,RP} \cdot (v_x t_{TTS}) + 12a_{4,RP} \cdot (v_x t_{TTS})^2 + 20a_{5,RP} \cdot (v_x t_{TTS})^3 = y''_{AP}(v_x t_{TTS}), \quad (87)$$

According to another embodiment of the invention, similar processes as those discussed above can be used to provide collision avoidance with a moving object in both the transverse and longitudinal direction during manual or semi-autonomous vehicle driving. For manual vehicle driving, the vehicle is not following a calculated vehicle path that is determined for lane centering and as such the algorithm does not know what path the vehicle is following. However, using vehicle motion sensing data and vehicle dynamics, the path of the vehicle can be predicted in the path prediction processor 42, and this predicted vehicle path can be used to determine if a collision with a moving object could occur, and if so, take automatic evasive steering action.

Figure 5:
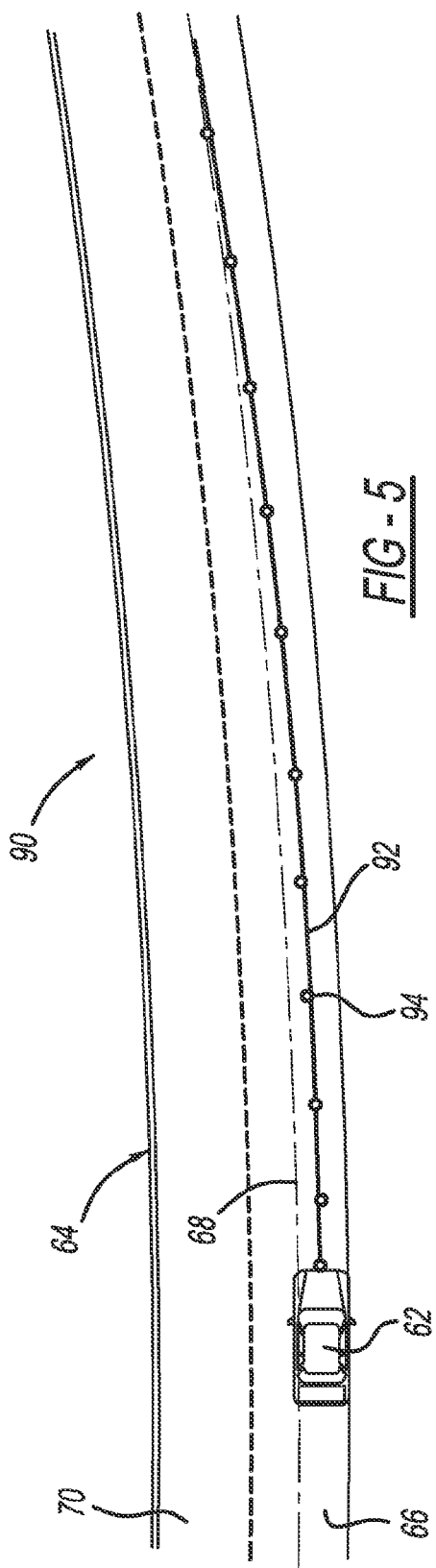
FIG. 5 is an illustration of a vehicle traveling on a roadway showing a predicted vehicle path.

FIG. 5 is an illustration 90 of the roadway 64 where like elements to the illustrations 60 and 100 are identified with the same reference numeral. In this embodiment, as will be discussed in detail below, the vehicle 62 is not following the lane centering path 72, but is following a predicted path 92 that is determined from vehicle motion sensing data and vehicle parameters in the path prediction processor 42.

Figure 6:
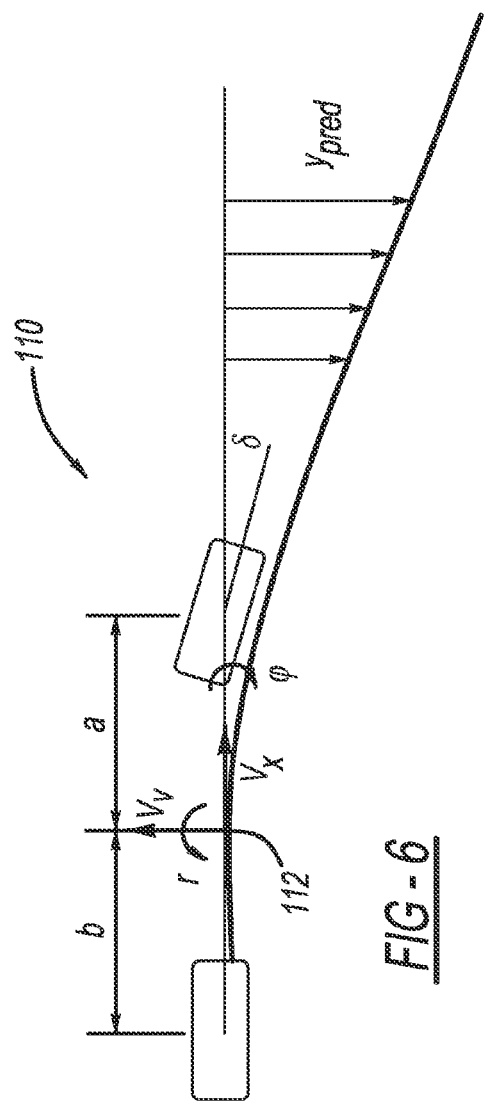
FIG. 6 is an illustration of vehicle motion model.

FIG. 6 is an illustration 110 of a motion model showing how the vehicle predicted path 92 can be determined as a time series based on the vehicle steering angle δ relative to a vehicle center of gravity 112 by solving differential equation (88) from the vehicle motion sensing data $v_x$, r and δ and the vehicle parameters m, I, $C_f$, $C_r$, a and b.

$$\begin{bmatrix} \dot{y}_{pred} \\ \dot{\varphi}_{pred} \\ \dot{v}_y \\ \dot{r} \end{bmatrix} = \begin{bmatrix} 0 & v_x & 1 & 0 \\ 0 & 0 & 0 & 1 \\ 0 & 0 & -\dfrac{C_f + C_r}{mv_x} & \dfrac{bC_r - aC_f}{mv_x} - v_x \\ 0 & 0 & \dfrac{bC_r - aC_f}{Iv_x} & \dfrac{a^2 C_f + b^2 C_r}{Iv_x} \end{bmatrix} \cdot \begin{bmatrix} y_{pred} \\ \varphi_{pred} \\ v_y \\ r \end{bmatrix} + \begin{bmatrix} 0 \\ 0 \\ \dfrac{C_f}{m} \\ \dfrac{aC_f}{I} \end{bmatrix} \cdot \delta. \quad (88)$$

where $y_{pred}$ is the lateral position of vehicle, $\varphi_{pred}$ is the vehicle heading angle, $v_x$ is the vehicle longitudinal speed, $v_y$ is the vehicle lateral speed, r is the vehicle yaw rate, δ is the steering angle, m is vehicle mass, I is vehicle inertia, $C_f$ and $C_r$ are vehicle front and rear cornering stiffness, respectively and a and b are distances to the vehicle front and rear axle, respectively, from the center of gravity 112.

The curvature of the predicted path 92 can be determined based on the deviation of the lateral position $y_{pred}$ at different distances from the current location of the vehicle 62. Using the predicted path 92 of the vehicle 62, the algorithm can determine a location of the vehicle 62 at different waypoints 94 along the predicted path 92 as $(x_{pred,1}, y_{pred,1})$, $(x_{pred,2}, y_{pred,2})$, $(x_{pred,3}, y_{pred,3})$, etc., where the values 1, 2 and 3 represent sample times. If the sample time is 0.1 sec, for example, then $(x_{pred,1}, y_{pred,1})$ is the waypoint sampled at time t=0.1 sec. Stated differently, solving equation (88) provides the series of sample waypoints 94, which is a time series solution. The time series solution is obtained at each sample time, such as 0.1 sec. For example, $y_{pred,1}$ is the solution of equation (88) at t=0.1 sec, $y_{pred,2}$ is the solution of equation (88) at t=0.2 sec, etc. The value $x_{pred,1}$ is calculated as $v_x *0.1$ sec, $x_{pred,2}$ is calculated as $v_x *0.2$ sec, etc.

Once $(x_{pred,1}, y_{pred,1})$, $(x_{pred,2}, y_{pred,2})$, $(x_{pred,3}, y_{pred,3})$, etc., are obtained, then the curve fitting algorithm determines the best fitting curve through $(x_{pred,1}, y_{pred,1})$, $(x_{pred,2}, y_{pred,2})$, $(x_{pred,3}, y_{pred,3})$, etc., and the predicted path $y_{PP}$ of the vehicle 62 can be defined by a third-order polynomial equation:

$$y_{PP}(x) = p_3 \cdot x^3 + p_2 \cdot x^2 + p_1 \cdot x + p_0, \quad (89)$$

where the parameter $p_1$, $p_2$, $p_3$ and $p_4$ are unknowns, and are calculated by a least-squares method minimizing the cost function J:

$$J = \frac{1}{2} \sum_i [(y_{pred,i} - y_{PP}(x = x_{pred,i}))^2], \quad (90)$$

where the solution of the cost function J is given by:

$$\begin{bmatrix} p_3 \\ p_2 \\ p_1 \\ p_0 \end{bmatrix} = \begin{bmatrix} x_{pred,1}^3 & x_{pred,1}^2 & x_{pred,1} & 1 \\ \cdots & \cdots & \cdots & 1 \\ x_{pred,n}^3 & x_{pred,n}^2 & x_{pred,n} & 1 \end{bmatrix}^{-1} \cdot \begin{bmatrix} y_{pred,1} \\ y_{pred,2} \\ \cdots \\ y_{pred,n} \end{bmatrix}. \quad (91)$$

If the cost function J at a waypoint $x_{pred,i}$ exceeds a certain limit $J \geq J_{threshold}$, the algorithm ends a first segment of the path 92 at point $x_{pred,i}$ and starts a new predicted path as:

$$y_{PP,seg2} = p_{3,seg2} \cdot x^3 + p_{2,seg2} \cdot x^2 + p_{1,seg2} \cdot x + p_{0,seg2}. \quad (92)$$

Once the predicted path 92 has been determined as above, the algorithm proceeds to determine if a collision with a moving object is a concern as also discussed above, and if so, whether braking can prevent the collision, or if steering is required. If steering is required, the algorithm proceeds to determine the collision boundary 76, the waypoints 78 and 80, the collision avoidance path 82, the cruise path 104 and the return path 86 as discussed above, where the vehicle controller will take over steering of the vehicle 62 from the vehicle driver and those paths will be calculated as fifth-order polynomial equations in the same manner as discussed above.

Figure 7:
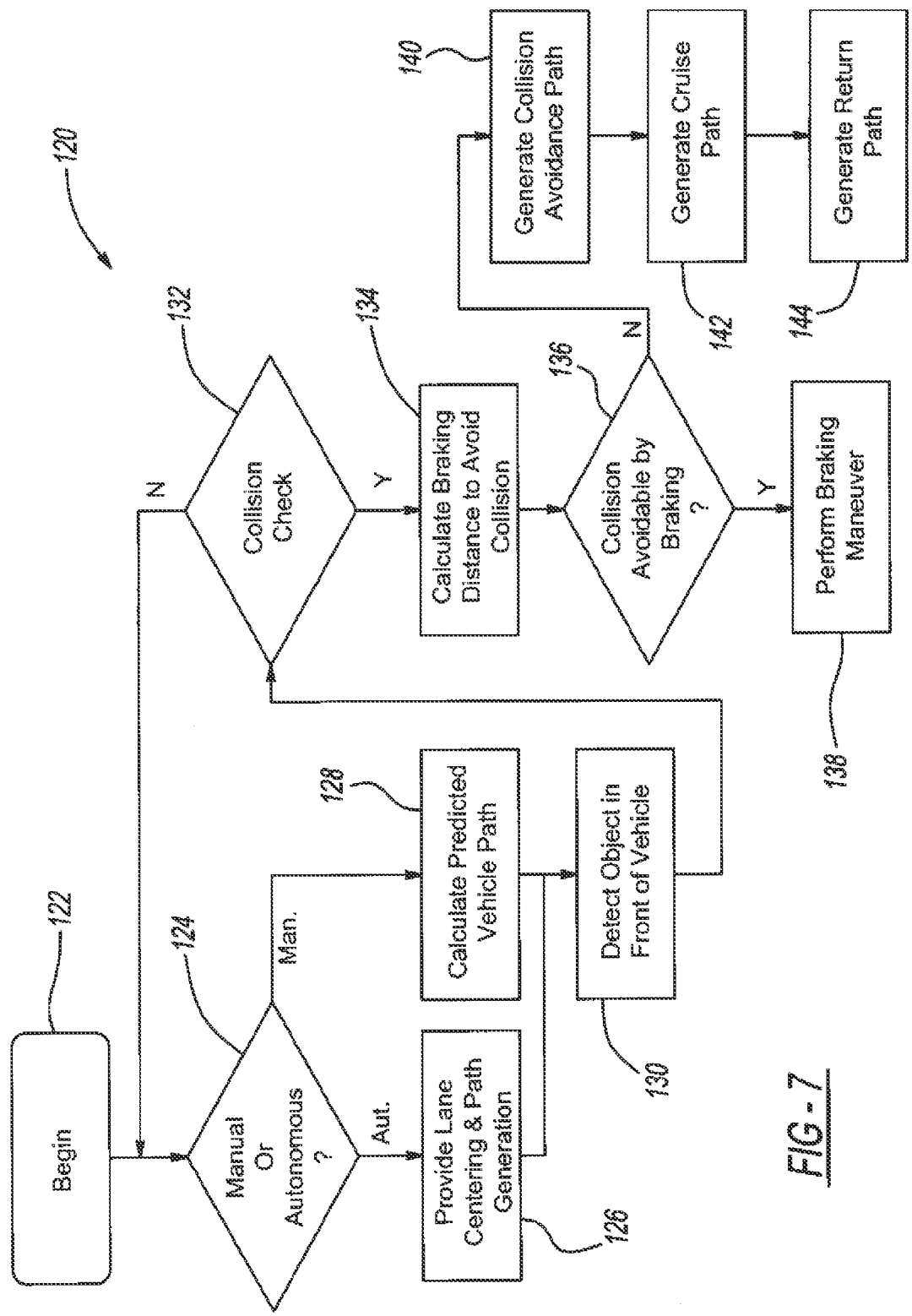
FIG. 7 is a flow chart diagram showing a process for evading a moving object.

FIG. 7 is a flow chart diagram 120 providing a general process flow of the discussion above for providing collision avoidance. The algorithm starts at box 122 and then determines if the vehicle 62 is in manual driving or autonomous driving at decision diamond 124. If the vehicle 62 is in autonomous driving, then the algorithm provides lane centering and path generation as described above at box 126, and if the vehicle 62 is being manually driven, then the algorithm calculates the predicted vehicle path 94 as discussed above at box 128. The algorithm then determines if an object is detected in front of the vehicle at box 130, and if so, performs a collision check to determine if a collision with the object will occur at the current vehicle speed and path at decision diamond 132. If no collision will occur, the algorithm returns to the start box 122. If a collision will occur at the decision diamond 132, the algorithm calculates the braking distance to avoid the collision at box 134, and then determines if the collision is avoidable by braking at decision diamond 136, as discussed above. If the collision can be avoided by braking alone at the decision diamond 136, then the algorithm performs the braking maneuver at box 138. If the algorithm determines that the collision cannot be avoided by braking and steering is required, the collision avoidance path 82 is generated at box 140, the cruise path 104 is generated at box 142 and the return path is generated at box 144.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing an automatic steering path for a vehicle, said method comprising:
    determining that the vehicle is being manually driven by a vehicle driver;
    determining a predicted path of the vehicle based on vehicle motion sensing data and vehicle parameters, where determining a predicted path includes determining a set of waypoints on the predicted path via a time series solution of a differential equation including vehicle heading angle, vehicle longitudinal speed, vehicle lateral speed, vehicle yaw rate, vehicle steering angle, vehicle mass, vehicle inertia, vehicle front and rear cornering stiffnesses and distances between vehicle axles and vehicle center of gravity;
    detecting a moving object in front of the vehicle;
    determining if a collision between the vehicle and the object will occur if the vehicle travels along the predicted path at a current vehicle speed;
    determining whether braking alone will prevent the collision with the object if it is determined that the collision will occur;
    determining a steering path around the object if it is determined that vehicle braking will not prevent a collision with the object;
    automatically steering the vehicle along the steering path; and
    yielding the steering control back to the driver from the automatic steering.

2. The method according to claim 1 wherein determining the predicted path in time series includes solving the differential equation:

$$\begin{bmatrix} \dot{y}_{pred} \\ \dot{\varphi}_{pred} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & \frac{a^2 C_f + b^2 C_r}{Iv_x} \end{bmatrix} \cdot \begin{bmatrix} y_{pred} \\ \varphi_{pred} \\ v_y \\ r \end{bmatrix} + \begin{bmatrix} 0 \\ 0 \\ \frac{C_f}{m} \\ \frac{aC_f}{I} \end{bmatrix} \cdot \delta,$$

where $y_{pred}$ is the lateral position of the vehicle, $\phi_{pred}$ is the vehicle heading angle, $v_x$ is the vehicle longitudinal speed, $v_y$ is the vehicle lateral speed, r is the vehicle yaw rate, $\delta$ is the steering angle, m is the vehicle mass, I is the vehicle inertia, $C_f$ and $C_r$ are the vehicle front and rear cornering stiffnesses, respectively, and a and b are the distances to the vehicle front and rear axle, respectively, from the center of gravity.

3. The method according to claim 2 wherein determining the predicted path includes defining the time series predicted path as a parametric third-order polynomial equation.

4. The method according to claim 3 wherein determining the parametric predicted path includes solving unknown parameters in the polynomial equation by minimizing a cost function.

5. The method according to claim 1 wherein determining whether vehicle braking alone will prevent the collision includes calculating a required deceleration to avoid the collision and comparing the required deceleration with a maximum capable deceleration of the vehicle.

6. The method according to claim 1 wherein determining if a collision between the vehicle and the object will occur includes defining a collision boundary around the moving object that is based on a speed of the moving object, moving direction of the object, a size of the moving object and a time-to-collision value, and determining if the lane centering path crosses the collision boundary.

7. The method according to claim 6 wherein determining a steering path around the object includes determining a collision avoidance path from the current vehicle position to a waypoint on the collision boundary, said method further comprising steering the vehicle to the waypoint on the collision avoidance path.

8. The method according to claim 7 wherein determining the collision avoidance path includes selecting one of a plurality of possible collision avoidance paths to multiple waypoints on the collision boundary where the closest waypoint to the current vehicle position that is within roadway boundaries is selected as the algorithm avoidance path.

9. The method according to claim 7 wherein determining the collision avoidance path includes solving a fifth-order polynomial equation based on initial vehicle conditions and roadway boundary conditions.

10. The method according to claim 9 wherein the fifth-order polynomial equation is:

$$y_{AP}(x) = a_{5,AP}x^5 + a_{4,AP}x^4 + a_{3,AP}x^3 + a_{2,AP}x^2 + a_{1,AP}x + a_{0,AP},$$

for time $0 < t < t_{TTC}$, wherein the initial conditions are defined as:

$$y_{AP}(0) = 0,$$

$$y'_{AP}(0) = 0,$$

$$y''_{AP}(0) = 2c_2,$$

and the boundary conditions are defined as:

$$y_{AP}(v_x t_{TTC}) = y_{lane}(v_x t_{TTC}) + D_{LC},$$

$$y'_{AP}(v_x t_{TTC}) = y'_{lane}(v_x t_{TTC}),$$

$$y''_{AP}(v_x t_{TTC}) = y''_{lane}(v_x t_{TTC}),$$

where $y_{AP}$ is vehicle lateral position on the collision avoidance path, $y_{lane}$ is vehicle lateral position on the lane centering path, $a_{0,AP}$, $a_{1,AP}$, $a_{2,AP}$, $a_{3,AP}$, $a_{4,AP}$ and $a_{5,AP}$ are unknown coefficients and to be determined using the initial conditions and the boundry conditions, $t_{TTC}$ is the time-to-collision value, $v_x$ is vehicle longitudinal speed, and $D_{LC}$ is a lateral deviation from the lane center.

11. The method according to claim 7 wherein detecting a moving object in front of the vehicle includes determining whether the moving object is moving in a transverse direction or a lateral direction relative to the lane centering path.

12. The method according to claim 11 wherein determining a steering path around the object includes determining a return path from the waypoint to the lane center if the object is moving in a transverse direction.

13. The method according to claim 12 wherein determining a return path includes determining the return path by solving a fifth-order polynomial equation based on initial conditions and roadway boundary conditions.

14. The method according to claim 13 wherein the fifth-order polynomial equation is:

$$y_{RP}(x) = a_{5,RP}x^5 + a_{4,RP}x^4 + a_{3,RP}x^3 + a_{2,RP}x^2 + a_{1,RP}x + a_{0,RP},$$

for time $t_{TTC} < t < t_{TTR}$, wherein the initial conditions are defined as:

$$y_{RP}(v_x t_{TTC}) = y_{AP}(v_x t_{TTC}),$$

$$y'_{RP}(v_x t_{TTC}) = y'_{AP}(v_x t_{TTC}),$$

$$y''_{RP}(v_x t_{TTC}) = y''_{AP}(v_x t_{TTC}),$$

and the boundary conditions are defined as:

$$y_{RP}(v_x t_{TTR}) = y_{lane}(v_x t_{TTR}),$$

$$y'_{RP}(v_x t_{TTR}) = y'_{lane}(v_x t_{TTR}),$$

$$y''_{RP}(v_x t_{TTR}) = y''_{lane}(v_x t_{TTR}),$$

where $y_{AP}$ is vehicle lateral position on the collision avoidance path, $y_{RP}$ is vehicle lateral position on the return path, $y_{lane}$ is vehicle lateral position on the lane centering path, $a_{0,RP}$, $a_{1,RP}$, $a_{2,RP}$, $a_{3,RP}$, $a_{4,RP}$ and $a_{5,RP}$ are unknown coefficients and to be determined using the initial conditions and the boundry conditions, $t_{TTC}$ is the time-to-collision value, $t_{TTR}$ is a time-to-return value, and $v_x$ is vehicle longitudinal speed.

15. The method according to claim 12 wherein determining a vehicle steering path includes determining a cruise path between the collision avoidance path and the return path if the object is moving in a longitudinal direction relative to the vehicle or the object is too long to be avoided only by the collision avoidance path and the return path.

16. The method according to claim 15 wherein determining the cruise path includes solving a fifth-order polynomial equation based on initial conditions and roadway boundary conditions.

17. The method according to claim 16 wherein the fifth-order polynomial equation is:

$$y_{CP}(x) = a_{5,CP}x^5 + a_{4,CP}x^4 + a_{3,CP}x^3 + a_{2,CP}x^2 + a_{1,CP}x + a_{0,CP},$$

for time $t_{TTC} < t < t_{TTS}$, wherein the initial conditions are defined as:

$$y_{CP}(v_x t_{TTC}) = y_{AP}(v_x t_{TTC}),$$

$$y'_{CP}(v_x t_{TTC}) = y'_{AP}(v_x t_{TTC}),$$

$$y''_{CP}(v_x t_{TTC}) = y''_{AP}(v_x t_{TTC}),$$

and the boundary conditions are defined as:

$$y_{CP}(v_x t_{TTS}) = y_{lane}(v_x t_{TTS}) + D_{LC},$$

$$y'_{CP}(v_x t_{TTS}) = y'_{lane}(v_x t_{TTS}),$$

$$y''_{CP}(v_x t_{TTS}) = y''_{lane}(v_x t_{TTS}),$$

where $y_{AP}$ is vehicle lateral position on the collision avoidance path, $y_{CP}$ is vehicle lateral position on the cruise path, $y_{lane}$ is vehicle lateral position on the lane centering path, $a_{0,CP}$, $a_{1,CP}$, $a_{2,CP}$, $a_{3,CP}$, $a_{4,CP}$ and $a_{5,CP}$ are unknown coefficients and to be determined using the initial conditions and the boundry conditions, $t_{TTC}$ is the time-to-collision value, $t_{TTS}$ is a time-to-cruise value, $v_x$ is vehicle longitudinal speed, and $D_{LC}$ is a deviation from the lane center.

18. The method according to claim 17 wherein a length of the cruise path is defined by the time-to-cruise value that is determined from the speed of the object and its direction as:

$$t_{TTS} = t_{TTC} + \frac{v_x - v_{x,obs}}{l} + t_{margin},$$

where $v_x$ is vehicle speed, $v_{x,obs}$ is the speed of the object, l is the length of the object, and $t_{margin}$ is a safety margin in the cruise time.

19. A method for providing an automatic steering path for a vehicle, said method comprising:
  determining that the vehicle is being manually driven by a vehicle driver;
  determining a predicted path of the vehicle based on vehicle motion sensing data and vehicle parameters, where determining a predicted path includes determining a set of waypoints on the predicted path via a time series solution of a differential equation including vehicle heading angle, vehicle longitudinal speed, vehicle lateral speed, vehicle yaw rate, vehicle steering angle, vehicle mass, vehicle inertia, vehicle front and rear cornering stiffnesses and distances between vehicle axles and vehicle center of gravity;

detecting a moving object in front of the vehicle;

determining if a collision between the vehicle and the object will occur if the vehicle travels along the predicted path at a current vehicle speed;

determining a collision avoidance path from the current vehicle position to a safe waypoint adjacent to the moving object, wherein determining the collision avoidance path includes solving a fifth-order polynomial equation;

steering the vehicle from the current vehicle position to the waypoint on the collision avoidance path;

determining a return path from the waypoint to the lane center, wherein determining a return path includes solving a fifth-order polynomial equation;

steering the vehicle from the waypoint on the return path; and yielding steering control back to the driver from automatic steering.

20. A method for providing an automatic steering path for a vehicle, said method comprising:

determining that the vehicle is being manually driven by a vehicle driver;

determining a predicted path of the vehicle based on vehicle motion sensing data and vehicle parameters, where determining a predicted path includes determining a set of waypoints on the predicted path via a time series solution of a differential equation including vehicle heading angle, vehicle longitudinal speed, vehicle lateral speed, vehicle yaw rate, vehicle steering angle, vehicle mass, vehicle inertia, vehicle front and rear cornering stiffnesses and distances between vehicle axles and vehicle center of gravity;

detecting a moving object in front of the vehicle;

determining if a collision between the vehicle and the object will occur if the vehicle travels along the predicted path at a current vehicle speed;

determining a collision avoidance path from the current vehicle position to a safe waypoint adjacent to the moving object, wherein determining the collision avoidance path includes solving a fifth-order polynomial equation;

steering the vehicle from the current vehicle position to the waypoint on the collision avoidance path;

determining a cruise path from the waypoint to an avoidance location beyond the object, wherein determining the cruise path includes solving a fifth-order polynomial equation;

steering the vehicle from the waypoint to the avoidance location on the cruise path;

determining a return path from the avoidance location to the lane center, wherein determining a return path includes solving a fifth-order polynomial equation;

steering the vehicle from the avoidance location on the return path; and yielding steering control back to the driver from automatic steering.

* * * * *